(12) United States Patent
Kim

(10) Patent No.: US 9,740,556 B2
(45) Date of Patent: Aug. 22, 2017

(54) SEMICONDUCTOR MEMORY APPARATUS AND OPERATING METHOD THEREOF

(71) Applicant: SK hynix Inc., Icheon-si, Gyeonggi-do (KR)

(72) Inventor: Jae Il Kim, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 147 days.

(21) Appl. No.: 14/282,379

(22) Filed: May 20, 2014

(65) Prior Publication Data

US 2015/0227417 A1    Aug. 13, 2015

(30) Foreign Application Priority Data

Feb. 10, 2014  (KR) ................. 10-2014-0014995

(51) Int. Cl.
*G11C 29/00* (2006.01)
*G06F 11/10* (2006.01)

(52) U.S. Cl.
CPC .............................. *G06F 11/1008* (2013.01)

(58) Field of Classification Search
CPC ...................................................... G06F 11/1008
USPC ............................................................ 714/764
See application file for complete search history.

(56) References Cited

U.S. PATENT DOCUMENTS

| 6,584,526 | B1 | 6/2003 | Bogin et al. | |
|---|---|---|---|---|
| 2010/0042889 | A1* | 2/2010 | Hargan | 714/752 |
| 2012/0166904 | A1* | 6/2012 | Bandholz | 714/746 |
| 2013/0346798 | A1* | 12/2013 | Moyer | 714/27 |

* cited by examiner

*Primary Examiner* — Guy Lamarre
(74) *Attorney, Agent, or Firm* — William Park & Associates

(57) ABSTRACT

A semiconductor memory apparatus may include an error check and correction circuit block configured to receive a plurality of cell data, and output error-checked data and error data discrimination signals after receiving an error check enable signal; and a data bus inversion circuit block configured to receive the plurality of cell data, and output the plurality of cell data by inverting or non-inverting the cell data after receiving a read data bus inversion enable signal, the error check enable signal and the error data discrimination signals.

17 Claims, 5 Drawing Sheets

SEMICONDUCTOR MEMORY APPARATUS AND OPERATING METHOD THEREOF

CROSS-REFERENCES TO RELATED APPLICATION

The present application claims priority under 35 U.S.C. §119(a) to Korean application number 10-2014-0014995, filed on Feb. 10, 2014, in the Korean Intellectual Property Office, which is incorporated herein by reference in its entirety.

BACKGROUND

1. Technical Field

Various embodiments generally relate to a semiconductor integrated apparatus, and more particularly, to a semiconductor memory apparatus and an operating method thereof.

2. Related Art

A semiconductor memory apparatus may include error check functions and data bus inversion (DBI) functions to improve the reliability and efficiency of data transmissions.

The error check function may refer to a function for determining whether an error has occurred during transmission of data and recovering data in which an error has occurred.

The data bus inversion (DBI) function may refer to a function that, according to the levels of data to be simultaneously written in memory cells or data to be simultaneously read from memory cells, the data are inputted or outputted as they are when data of a specified level (for example, a high voltage logic level) are greater and the data are inputted or outputted by being inverted when data of the other level (for example, a low voltage logic level) are greater. By introducing the DBI function, the number of data pins with a low voltage logic level may be decreased to one half and current consumption may be reduced.

In general, in the semiconductor memory apparatus which performs both an error check function and a DBI function, DBI is performed after error check and correction is completed for cell data in a data read operation.

Therefore, when cell data are loaded to a global data transmission line, valid DBI information is outputted after the data processing time of the ECC circuit block and the data processing time of the DBI circuit block have passed. This may increase a latency in the read operation, and may serve as a factor that impedes increasing a data processing speed.

SUMMARY

In an embodiment, a semiconductor memory apparatus may include an error check and correction circuit block configured to receive a plurality of cell data. The error check error check and correction circuit block may also be configured to output error-checked data and error data discrimination signals in response to an error check enable signal. The semiconductor memory apparatus may also include a data bus inversion circuit block configured to receive the plurality of cell data. The data bus inversion circuit block may also output the plurality of cell data by inverting or non-inverting the cell data in response to a read data bus inversion enable signal, the error check enable signal and the error data discrimination signals.

In an embodiment, a method for operating a semiconductor memory apparatus may include an error checking and correcting action of receiving a plurality of cell data. The method for operating a semiconductor memory apparatus may also include outputting error-checked data and error data discrimination signals. The method for operating a semiconductor memory apparatus may further include a data inverting action of receiving the plurality of cell data, and outputting the plurality of cell data by inverting or non-inverting the cell data after receiving a read data bus inversion enable signal, an error check enable signal and the error data discrimination signals. Whereby the error checking and correcting action and the data inverting action may be performed at substantially the same time.

DETAILED DESCRIPTION

Various embodiments and examples of a semiconductor memory apparatus will be described below with reference to the accompanying drawings.

Figure 1:
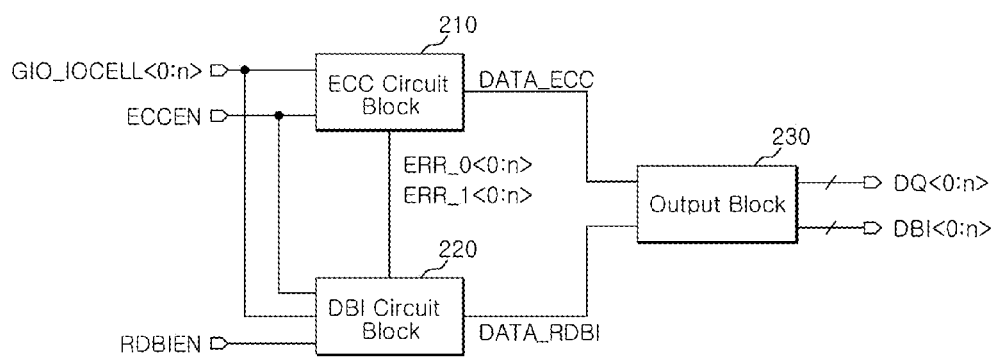
FIG. 1 is a configuration diagram illustrating a representation of a semiconductor memory apparatus in accordance with an embodiment.

FIG. 1 is a configuration diagram illustrating examples of representations of a semiconductor memory apparatus in accordance with an embodiment.

The semiconductor memory apparatus 2 illustrated in FIG. 1 may include an error check and correction (ECC) circuit block 210 and a data bus inversion (DBI) circuit block 220. The semiconductor memory apparatus 2 may also include an output block 230.

During a read operation, the ECC circuit block 210 may receive a plurality of cell data GIO_IOCELL<0:n> from a memory cell array through a global data transmission line. The ECC circuit block 210 may correct an error found the plurality of cell data GIO_IOCELL<0:n> after receiving or in response to receiving an error check enable signal ECCEN. The ECC circuit block 210 may then output error-checked data DATA_ECC. Further, the ECC circuit block 210 may output error data discrimination signals ERR_0<0:n> and ERR_1<0:n> according to the voltage logic level of the data in which an error has occurred. The error data discrimination signals ERR_0<0:n> and ERR_1<0:n> may include first error data discrimination signals ERR_0<0:n> and second error data discrimination signals ERR_1<0:n>. The first error data discrimination signals ERR_0<0:n> may be enabled when the level of the data in which an error has occurred was at a low voltage logic level (i.e., 0). The second error data discrimination signals ERR_1<0:n> may be enabled when the level of the data in which an error has occurred was at a high voltage logic level (i.e., 1).

In a read operation, the DBI circuit block 220 may receive the plurality of cell data GIO_IOCELL<0:n> through the global data transmission line. The DBI circuit block 220 may then determine whether to perform a data inversion, based on the logic levels of the data included in the plurality of cell data GIO_IOCELL<0:n> and the level of data in which an error has occurred, after receiving or in response to receiving a read data bus inversion enable signal RDBIEN, the error check enable signal ECCEN, and the error data discrimination signals ERR_0<0:n> and ERR_1<0:n>. The DBI circuit block 220 may then perform data inversion when it is necessary, and may output DBI data DATA_RDBI.

The output block 230 receives the error-checked data DATA_ECC transmitted from the ECC circuit block 210 and receives the DBI data DATA_RDBI transmitted from the DBI circuit block 220. Further, the output block 230 may invert or non-invert the phases of the error-checked data DATA_ECC, based on the levels of the outputted DBI data DATA_RDBI provided from the DBI circuit block 220. The inverted or non-inverted error-checked data DATA_ECC may be outputted to first output terminals, that is, data DQ pads DQ<0:n>, and the data or DBI data DATA_RDBI transmitted from the DBI circuit block 220 may be outputted to the second output terminals, that is, DBI pins DBI<0:n>.

In other words, in the semiconductor memory apparatus 2 in accordance with an embodiment, at substantially the same time or the same time when error check and correction is performed in the ECC circuit block 210, the DBI circuit block 220 performs a data inverting operation. In particular, in preparation for a situation in which an error has occurred in the plurality of cell data GIO_IOCELL<0:n>, the DBI circuit block 220 may be provided with the error data discrimination signals ERR_0<0:n> and ERR_1<0:n> from the ECC circuit block 210 and may determine whether to perform data inversion, based on the voltage logic levels of the data included in the plurality of cell data GIO_IO-CELL<0:n> and the voltage logic level of data in which an error has occurred.

Since both the error-checked data DATA_ECC outputted from the ECC circuit block 210 and the DBI data DATA_RDBI outputted from the DBI circuit block 220 may be outputted at the same time or substantially the same time after receiving or in response to receiving the error check enable signal ECCEN, both the error-checked data DATA_ECC and DBI data DATA_RDBI may be provided to the output block 230 at the same time or substantially the same time.

Accordingly, because a data inversion function may be performed in the DBI circuit block 220 within the data processing time of the ECC circuit block 210, a latency in the read operation may be decreased.

Figure 2:
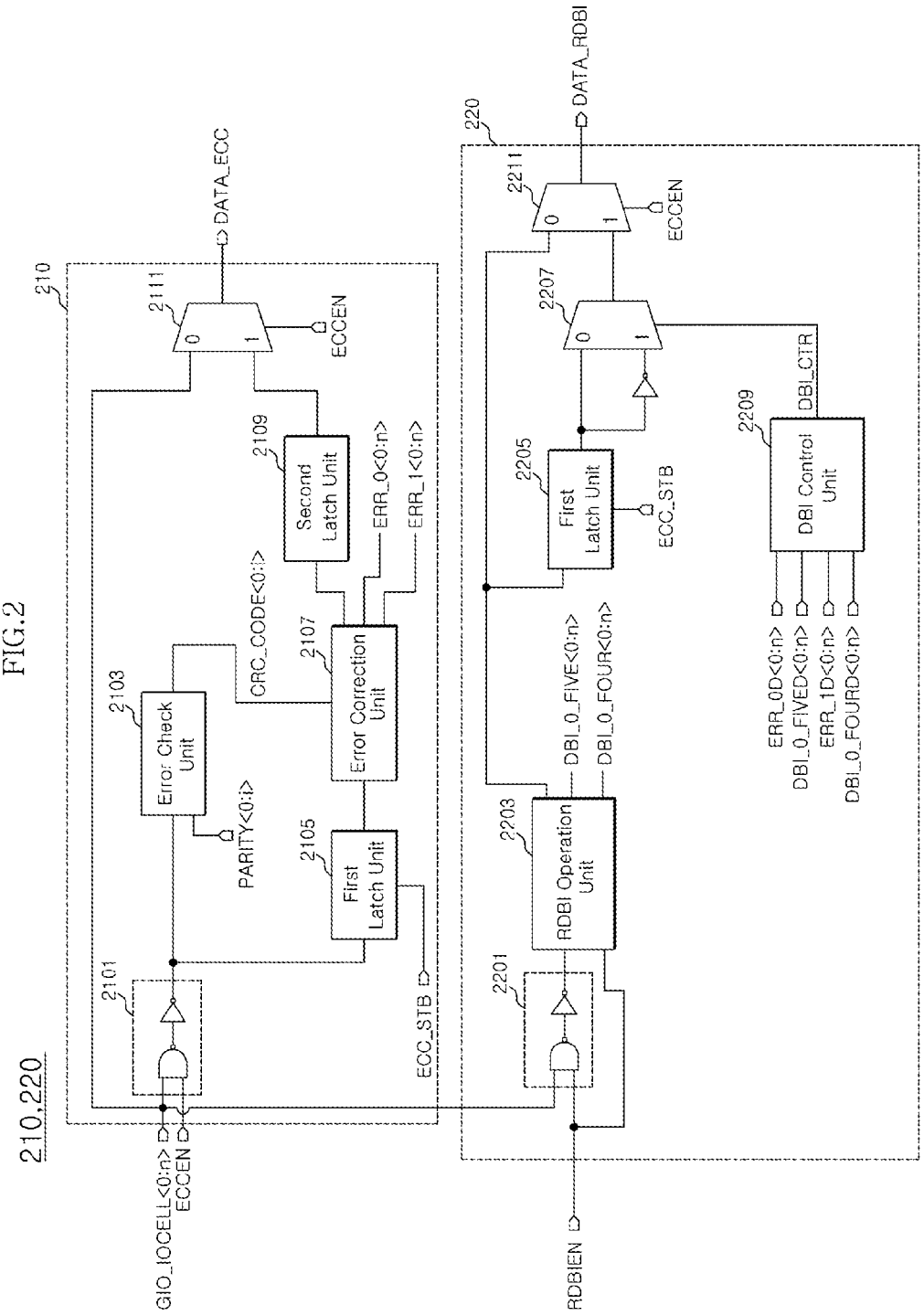
FIG. 2 is a configuration diagram illustrating a representation of the ECC circuit block and the DBI circuit block illustrated in FIG. 1.

FIG. 2 is a configuration diagram illustrating a representation of the ECC circuit block and the DBI circuit block illustrated in FIG. 1.

Referring to FIG. 2, the ECC circuit block 210 may include an input unit 2101, an error check unit 2103, and a first latch unit 2105. The ECC circuit block 210 may also include an error correction unit 2107, a second latch unit 2109, and an ECC output unit 2111.

The input unit 2101 may output the plurality of received cell data GIO_IOCELL<0:n> after receiving or in response to receiving the error check enable signal ECCEN.

The error check unit 2103 may check whether an error has occurred in the plurality of cell data GIO_IOCELL<0:n> provided from the input unit 2101. This check may be performed by using error check codes PARITY<0:i>. The error check unit 2103 may also generate error correction codes CRC_CODE<0:i>.

After receiving or in response to receiving an error check strobe signal ECC_STB the first latch unit 2105 may latch the plurality of cell data GIO_IOCELL<0:n>, and may output the plurality of cell data GIO_IOCELL<0:n>.

The error correction unit 2107 may correct the plurality of cell data GIO_IOCELL<0:n> received from the latch unit 2105 in accordance with the error correction codes CRC_CODE<0:i>. Then the error correction unit 2107 may output the error-corrected data. Additionally, the error correction unit 2107 may output the first error data discrimination signals ERR_0<0:n> which may be enabled when the voltage logic level of the data in which an error has occurred was at a low voltage logic level (i.e., 0) and the second error data discrimination signals ERR_1<0:n> which may be enabled when the voltage logic level of the data in which an error has occurred was at a high voltage logic level (i.e., 1).

For a predetermined time the second latch unit 2109 may latch the error-corrected data outputted and received from the error correction unit 2107.

The ECC output unit 2111 may be inputted with the plurality of cell data GIO_IOCELL<0:n> and the error-corrected data received from the second latch unit 2109. Then the ECC output unit 2111 may output the error-checked data DATA_ECC after receiving or in response to receiving the error check enable signal ECCEN.

The DBI circuit block 220 may include an input unit 2201, an RDBI operation unit 2203, and a first latch unit 2205. The DBI circuit block 220 may also include a selection unit 2207, a DBI control unit 2209, and a DBI output unit 2211.

The input unit 2201 may output a plurality of cell data GIO_IOCELL<0:n> after receiving or after receiving or in response to receiving the read data bus inversion enable signal RDBIEN.

The RDBI operation unit 2203 may determine whether to perform data inversion, according to the voltage logic levels of the data included in the plurality of cell data GIO_IO-CELL<0:n>. Then the RDBI operation unit 2203 performs the data inversion for the plurality of cell data GIO_IO-CELL<0:n> in accordance with the determination, and subsequently outputs the resultant data. The RDBI operation unit 2203 may output first inversion control signals DBI_0_FIVE<0:n> which are enabled when the majority of the data included in the plurality of cell data GIO_IO-CELL<0:n> are at a first voltage logic level. Additionally, the RDBI operation unit 2203 may output second inversion control signals DBI_0_FOUR<0:n> which are enabled when the minority of the data included in the plurality of cell data GIO_IOCELL<0:n> are at the first voltage logic level.

For example but not limited to, the RDBI operation unit 2203 may enable the first inversion control signals DBI_0_FIVE<0:n> when the amount of low voltage logic level data among the data included in the plurality of cell data GIO_IOCELL<0:n> is 5 or more, and may enable the second inversion control signals DBI_0_FOUR<0:n> when the amount of low voltage logic level data among the data included in the plurality of cell data GIO_IOCELL<0:n> is 4 or less.

For a predetermined time the first latch unit 2205 may latch the data received from the RDBI operation unit 2203. Then the first latch unit 2205 may output resultant data after receiving or in response to receiving the error check strobe signal ECC_STB.

The DBI control unit 2209 may determine whether to perform data inversion, after receiving or in response to receiving delayed signals ERR_0D<0:n> of the first error data discrimination signals ERR_0<0:n> provided from the ECC circuit block 210, delayed signals ERR_1D<0:n> of the second error data discrimination signals ERR_1<0:n>, delayed signals DBI_0_FIVED<0:n> of the first inversion control signals DBI_0_FIVE<0:n> provided from the RDBI operation unit 2203 and delayed signals DBI_0_FOURD<0:n> of the second inversion control signals DBI_0_FOUR<0:n>. Then the DBI control unit 2209 may output a DBI control signal DBI_CTR.

The selection unit 2207 may output any one of the output signals of the first latch unit 2205 and the inverted signals thereof, after receiving or in response to receiving the DBI control signal DBI_CTR.

The DBI output unit 2211 may output any one of the data received from the RDBI operation unit 2203 and the output data of the selection unit 2207, as the DBI data DATA_RDBI, after receiving or in response to receiving the error check enable signal ECCEN.

For example, when the first level data (or data having a first voltage logic level) out of all the data included in the plurality of cell data GIO_IOCELL<0:n> is a majority and thus inversion is necessary, if it is determined as a checking result of the ECC circuit block 210 that an error has occurred in the first level data, since the first level data actually hold a minority, the DBI circuit block 220 in accordance with an embodiment may invert again the inverted data and output resultant data. If it is determined as a checking result of the ECC circuit block 210 that an error has occurred in the second level data (or data having a second voltage logic level), since the first level data hold the majority, the DBI circuit block 220 may output inverted data.

For example, when the first level data out of all the data included in the plurality of cell data GIO_IOCELL<0:n> is a minority, that is, are counted to 4 or less (see example above), and thus inversion is not necessary, if it is determined as a checking result of the ECC circuit block 210 that an error has occurred in the second level data, since the first level data actually holds a majority, the DBI circuit block 220 may output inverted data. If it is determined as a checking result of the ECC circuit block 210 that an error has occurred in the first level data, since the first level data holds the minority, the DBI circuit block 220 may invert again the inverted data and output resultant data.

Therefore, the DBI circuit block 220 may determine whether to invert the plurality of cell data GIO_IOCELL<0:n>, based on the error data discrimination signals ERR_0<0:n> and ERR_1<0:n> received from the error correction unit 2107 of the ECC circuit block 210. Then the DBI circuit block 220 may determine whether to perform data bus inversion (DBI) for the final output data of the DBI circuit block 220. Because these operations are performed in parallel with the operations of the ECC circuit block 210, a latency in the read operation may be decreased.

Figure 3:
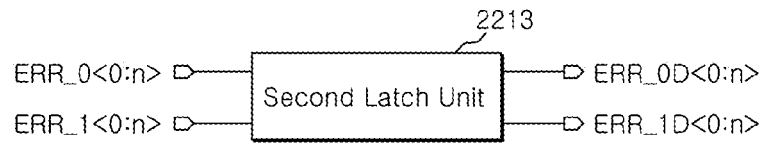
FIGS. 3 and 4 are views illustrating examples of representations of delay signal generation units applied with the elements of FIG. 2.
Figure 4:
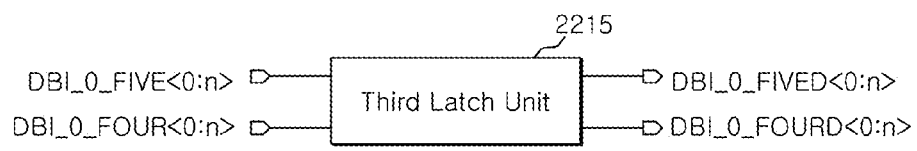

FIGS. 3 and 4 are views illustrating examples of representations of delay signal generation units applied with the elements of FIG. 2.

Referring to FIG. 3, the delayed signals ERR_0D<0:n> of the first error data discrimination signals ERR_0<0:n> and the delayed signals ERR_1D<0:n> of the second error data discrimination signals ERR_1<0:n> may be delayed for a predetermined time by a second latch unit 2213.

Also, referring to FIG. 4, the delayed signals DBI_0_FIVED<0:n> of the first inversion control signals DBI_0_FIVE<0:n> and the delayed signals DBI_0_FOURD<0:n> of the second inversion control signals DBI_0_FOUR<0:n> may be delayed for a predetermined time by a third latch unit 2215.

Figure 5:
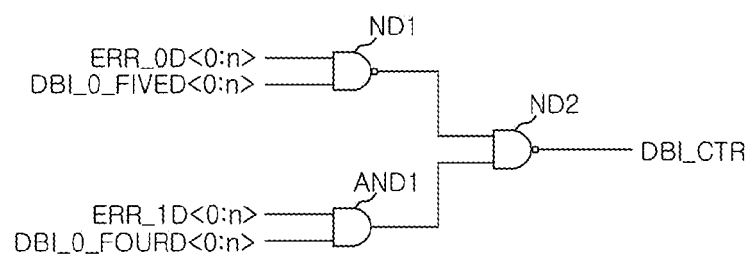
FIG. 5 is a view illustrating examples of representations of the DBI control unit illustrated in FIG. 2.

FIG. 5 is a view illustrating examples of representations of the DBI control unit illustrated in FIG. 2.

Referring to FIG. 5, the DBI control unit 2209 may determine whether to perform data inversion, after receiving or in response to receiving the delayed signals ERR_0D<0:n> of the first error data discrimination signals ERR_0<0:n>, the delayed signals ERR_1D<0:n> of the second error data discrimination signals ERR_1<0:n>, the delayed signals DBI_0_FIVED<0:n> of the first inversion control signals DBI_0_FIVE<0:n> and the delayed signals DBI_0_FOURD<0:n> of the second inversion control signals DBI_0_FOUR<0:n>. Then the DBI control unit 2209 may output the DBI control signal DBI_CTR.

The DBI control unit 2209 may include a first determination element ND1 for primarily determining whether to perform data inversion, according to whether an error has occurred at the first voltage logic level of the data when the first voltage logic level data are a majority of the data, after receiving or in response to receiving the delayed signals ERR_0D<0:n> of the first error data discrimination signals ERR_0<0:n> and the delayed signals DBI_0_FIVED<0:n> of the first inversion control signals DBI_0_FIVE<0:n>. The DBI control unit 2209 may also include a second determination element AND1 for secondarily determining whether to perform data inversion, according to whether an error has occurred at the second voltage logic level of the data when first voltage logic level data are a minority of the data, after receiving or in response to receiving the delayed signals ERR_1D<0:n> of the second error data discrimination signals ERR_1<0:n> and the delayed signals DBI_0_FOURD<0:n> of the second inversion control signals DBI_0_FOUR<0:n>. The DBI control unit 2209 may also include a third determination element ND2 for generating the DBI control signal DBI_CTR which finally determines whether to perform data inversion, according to the determination results of the first determination element ND1 and the second determination element AND1.

That is to say, the first determination element ND1 may determine that a DBI operation is not necessary, if the level of data in which an error has occurred is at the first voltage logic level when the first voltage logic level data are a majority of the data. The second determination element AND1 may determine that the DBI operation is necessary, if the level of data in which an error has occurred is at a second voltage logic level when first voltage logic level data hold a minority of the data. The third determination element ND2 may enable the DBI control signal DBI_CTR when any one of the first determination element ND1 and the second determination element AND1 determine that the DBI operation is not necessary.

Therefore, if the DBI control signal DBI_CTR is enabled, the selection unit 2207 of FIG. 2 is inversion-inputted again with the inversion data which are outputted by being latched by the first latch unit 2205 after being inverted by the RDBI operation unit 2203. Then outputs resultant data to the DBI output unit 2211. Conversely, if the DBI control signal DBI_CTR is disabled, the selection unit 2207 provides the inversion data which are outputted by being latched by the first latch unit 2205 after being inverted by the RDBI operation unit 2203, to the DBI output unit 2211, as they are.

Figure 6:
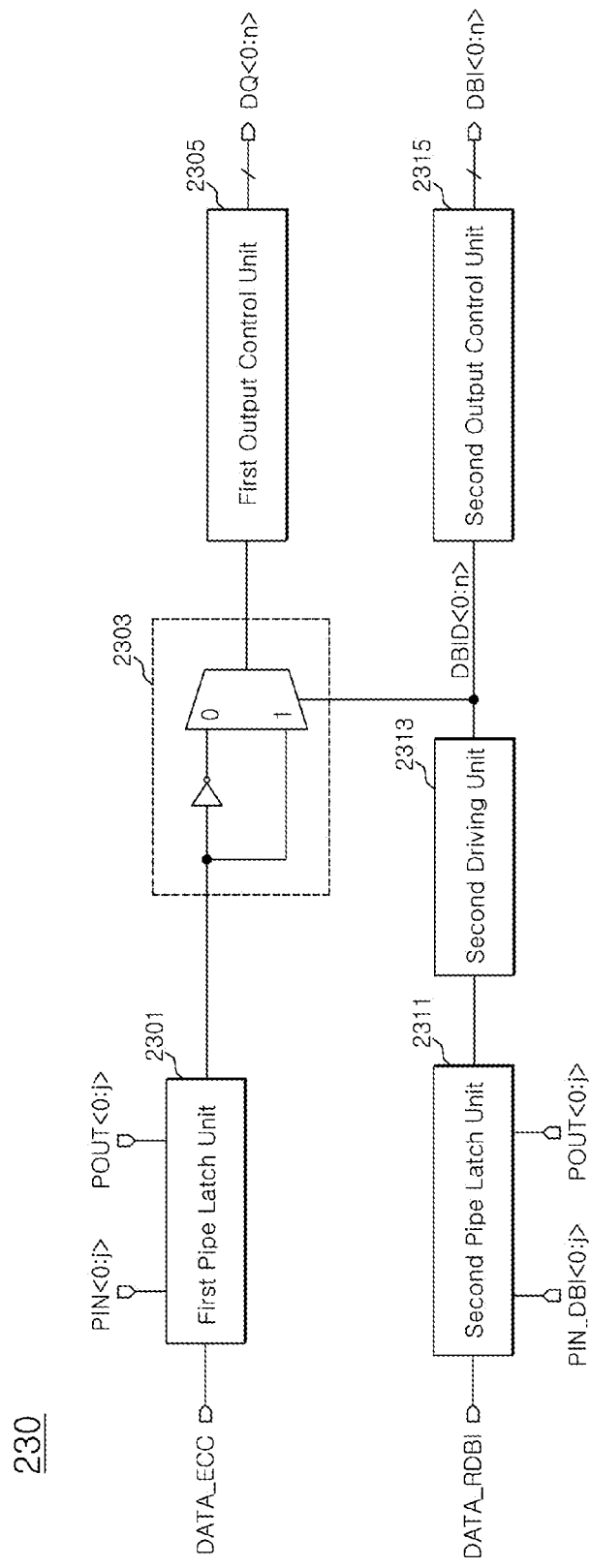
FIG. 6 is a view illustrating examples of representations of the output block illustrated in FIG. 1.

FIG. 6 is a view illustrating examples of representations of the output block illustrated in FIG. 1.

The output block 230 may include a first pipe latch unit 2301, a first driving unit 2303, and a first output control unit

2305. The output block 230 may also include a second pipe latch unit 2311, a second driving unit 2313, and a second output control unit 2315.

The first pipe latch unit 2301 may be sequentially inputted with the error-checked data DATA_ECC in synchronization with first pipe input signals PIN<0:j>, and may sequentially output the error-checked data DATA_ECC in synchronization with output signals POUT<0:j>.

The second pipe latch unit 2311 may be sequentially inputted with the DBI data DATA_RDBI provided from the DBI circuit block 220. This may be performed in synchronization with second pipe input signals PIN_DBI<0:j>, and the second pipe latch unit 2311 may sequentially output the DBI data DATA_RDBI in synchronization with the output signals POUT<0:j>.

The second driving unit 2313 may output the output data of the second pipe latch unit 2311 as driving DBI data DBID<0:n>.

The first driving unit 2303 may output the data provided from the first pipe latch unit 2301 or the inverted data thereof, after receiving or in response to receiving the driving DBI data DBID<0:n> received from the second driving unit 2313.

The first output control unit 2305 may output the output data of the first driving unit 2303 to the DQ pads DQ<0:n> as the first output terminals. Whereas, the second output control unit 2315 may output the output data of the second driving unit 2313 to the DBI pins DBI<0:n> as the second output terminals.

As is apparent from the above descriptions, in a semiconductor memory apparatus in which error check and correction functions and a data inversion function are simultaneously applied or substantially simultaneously applied, if data is loaded on a global data transmission line, the data inversion function is performed in parallel simultaneously with or substantially simultaneously with the error check and correction functions, whereby it may be possible to minimize a latency in a read operation.

Figure 7:
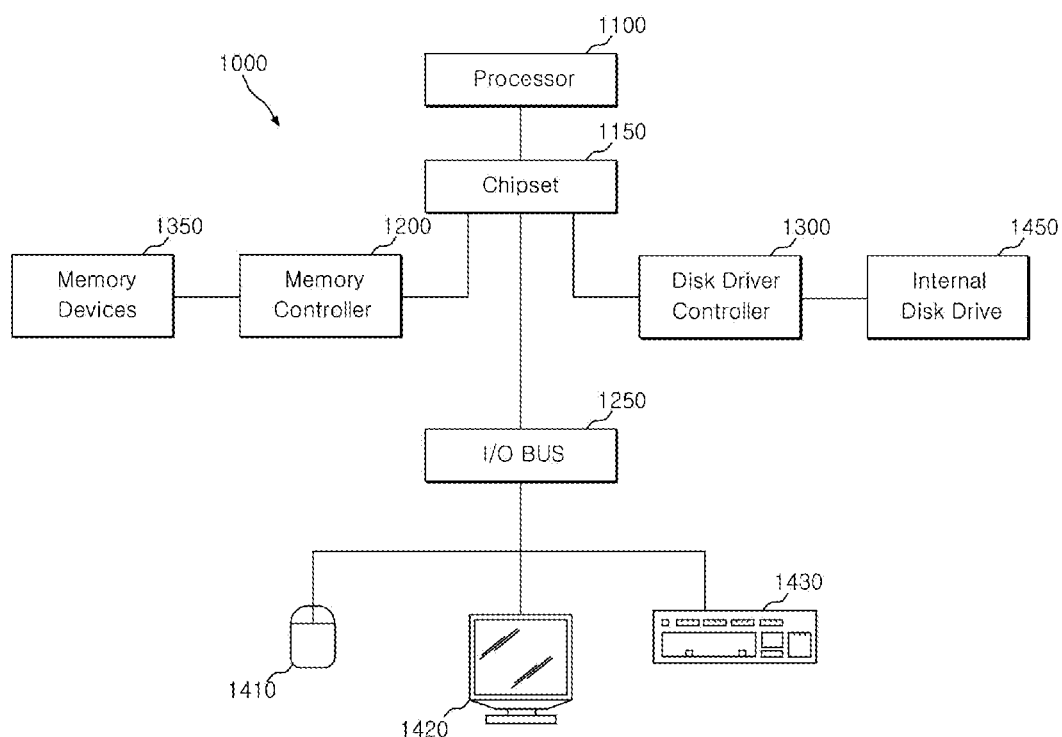
FIG. 7 illustrates a block diagram representation of a system employing the semiconductor memory apparatus in accordance with the embodiments discussed above with relation to FIGS. 1-6.

The semiconductor memory apparatus discussed above is particular useful in the design of memory devices, processors, and computer systems. For example, referring to FIG. 7, a block diagram of a system employing the semiconductor memory apparatus in accordance with the embodiments are illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be operably coupled to the chipset 1150. The memory controller 1200 may include at least one semiconductor memory apparatus as discussed above with reference to FIGS. 1-6. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the semiconductor memory apparatus as discussed above with relation to FIGS. 1-6, the memory devices 1350 may include a plurality of word lines and a plurality of bit lines for defining a plurality of memory cell. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 (i.e., internal disk drive) may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 7 is merely one example of a system employing the semiconductor memory apparatus as discussed above with relation to FIGS. 1-6. In alternate embodiments, such as cellular phones or digital cameras, the components may differ from the embodiments shown in FIG. 7.

While various embodiments have been described above, it will be understood to those skilled in the art that the embodiments described are by way of example only. Accordingly, the semiconductor memory apparatuses and the operating methods thereof described herein should not be limited based on the described embodiments. Rather, the semiconductor memory apparatuses and the operating methods thereof described herein should only be limited in light of the claims that follow when taken in conjunction with the above description and accompanying drawings.

What is claimed is:
1. A semiconductor memory apparatus comprising:
an error check and correction circuit block configured to receive a plurality of cell data, and output error-checked data and error data discrimination signals after receiving an error check enable signal; and
a data bus inversion circuit block configured to receive the plurality of cell data, and output the plurality of cell data by inverting or non-inverting the cell data in response to a read data bus inversion enable signal, the error check enable signal and the error data discrimination signals,
wherein the data bus inversion circuit block comprises:
a read data bus inversion operation unit configured to output the plurality of cell data by inverting or non-inverting the cell data according to the voltage logic levels of data included in the plurality of cell data, and generate a first inversion control signals and a second inversion control signals based on the number of data having a first voltage logic level that are included in the plurality of cell data;

a data bus inversion control unit configured to output a data bus inversion control signal based on the first inversion control signals, the second inversion control signal and the error data discrimination signals; and a selection unit configured to output output signals of the read data bus inversion operation unit by inverting or non-inverting the output signals in response to the data bus inversion control signal.

2. The semiconductor memory apparatus according to claim 1, wherein the error data discrimination signals are generated according to a voltage logic level of the cell data in which an error has occurred.

3. The semiconductor memory apparatus according to claim 1, wherein the error data discrimination signals comprise first error data discrimination signals which are enabled when a voltage logic level of data in which an error has occurred is at a first voltage logic level, and second error data discrimination signals which are enabled when a voltage logic level of data in which an error has occurred is at a second voltage logic level.

4. The semiconductor memory apparatus according to claim 3, wherein the data bus inversion circuit block outputs the plurality of cell data by inverting none of the cell data, when a voltage logic level of data in which an error has occurred is at the first voltage logic level and when data having the first voltage logic level, which are included in the plurality of cell data, are a majority of the cell data.

5. The semiconductor memory apparatus according to claim 3, wherein the data bus inversion circuit block outputs the plurality of cell data by inverting the cell data, when a voltage logic level of data in which an error has occurred is at the second voltage logic level and when data having the first voltage logic level, which are included in the plurality of cell data, are a minority of the cell data.

6. The semiconductor memory apparatus according to claim 1, wherein the error check and correction circuit block outputs the error-checked data in synchronization with the error check enable signal, and the data bus inversion circuit block outputs the plurality of cell data which are inverted or non-inverted, in synchronization with the error check enable signal.

7. The semiconductor memory apparatus according to claim 1, further comprising:

an output block configured to receive and output output signals of the error check and correction circuit block and the data bus inversion circuit block.

8. The semiconductor memory apparatus according to claim 7, wherein the output block outputs the output signals of the data bus inversion circuit block to first output terminals, and outputs the output signals of the error check and correction circuit block by inverting or non-inverting the output signals after receiving the output signals of the data bus inversion circuit block, to second output terminals.

9. A method for operating a semiconductor memory apparatus, comprising:

an error checking and correcting action of receiving a plurality of cell data, and outputting error-checked data and error data discrimination signals; and a data inverting action of receiving the plurality of cell data, and outputting the plurality of cell data by inverting or non-inverting the cell data in response to a read data bus inversion enable signal, an error check enable signal and the error data discrimination signals, wherein the error checking and correcting action and the data inverting action are performed at substantially the same time, and wherein the data inverting action comprises:

outputting the plurality of cell data by inverting or non-inverting the cell data according to the voltage logic levels of data included in the plurality of cell data, and generating first inversion control signals and second inversion control signals based on the number of data having a first voltage logic level that are included in the plurality of cell data;

outputting a data bus inversion control signal based on the first inversion control signals, the second inversion control signals and the error data discrimination signals; and outputting output signals of the outputting of the plurality of cell data, by inverting or non-inverting the output signals after receiving the data bus inversion control signal.

10. The method according to claim 9, wherein the cell data is received from a memory cell array.

11. The method according to claim 9, wherein the error data discrimination signals are generated according to a voltage logic level of cell data in which an error has occurred.

12. The method according to claim 9, wherein the error data discrimination signals comprise first error data discrimination signals which are enabled when a voltage logic level of data in which an error has occurred is at a first voltage logic level, and second error data discrimination signals which are enabled when a voltage logic level of data in which an error has occurred is at a second voltage logic level.

13. The method according to claim 12, wherein the data inverting action comprises outputting the plurality of cell data by inverting none of the cell data, when a voltage logic level of data in which an error has occurred is at the first voltage logic level and when data having the first voltage logic level, which are included in the plurality of cell data, are a majority of the cell data.

14. The method according to claim 12, wherein the data inverting action comprises outputting the plurality of cell data by inverting the cell data, when a voltage logic level of data in which an error has occurred is at the second voltage logic level and when data having the first voltage logic level, which are included in the plurality of cell data, are a minority of the cell data.

15. The method according to claim 9, wherein the error-checked data are outputted in synchronization with the error check enable signal, and the plurality of inverted or non-inverted cell data outputted in the data inverting action are outputted in synchronization with the error check enable signal.

16. The method according to claim 9, further comprising:

receiving output signals of the error checking and correcting action and the data inverting action, and outputting the output signals to output terminals.

17. The method according to claim 16, wherein, the outputting of the output signals comprises outputting the output signals of the data inverting action to first output terminals, and outputting the output signals of the error checking and correcting action by inverting or non-inverting the output signals after receiving the output signals of the data inverting action, to second output terminals.

* * * * *